United States Patent
Suzuki et al.

(10) Patent No.: US 8,811,958 B2
(45) Date of Patent: Aug. 19, 2014

(54) COMMUNICATION SYSTEM, INFORMATION ANALYSIS DEVICE, AND INFORMATION ANALYSIS METHOD

(75) Inventors: Toshihiro Suzuki, Yokohama (JP); Ichiro Okajima, Yokosuka (JP); Hiroshi Kawakami, Yokosuka (JP); Manhee Jo, Yokohama (JP); Daisuke Ochi, Yokosuka (JP); Tomohiro Nagata, Tokyo (JP); Motonari Kobayashi, Yokohama (JP); Yuki Oyabu, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 313 days.

(21) Appl. No.: 13/262,279

(22) PCT Filed: Mar. 26, 2010

(86) PCT No.: PCT/JP2010/055435
§ 371 (c)(1),
(2), (4) Date: Nov. 17, 2011

(87) PCT Pub. No.: WO2010/116905
PCT Pub. Date: Oct. 14, 2010

(65) Prior Publication Data
US 2012/0077473 A1     Mar. 29, 2012

(30) Foreign Application Priority Data

Apr. 6, 2009 (JP) ............... P2009-092228
Sep. 8, 2009 (JP) ............... P2009-207160

(51) Int. Cl.
*H04M 3/42* (2006.01)
*G01C 9/00* (2006.01)

(52) U.S. Cl.
USPC ....................... 455/414.1; 702/150

(58) Field of Classification Search
USPC ....................... 455/414.1; 702/150
See application file for complete search history.

(56) References Cited

U.S. PATENT DOCUMENTS

2003/0014213 A1* 1/2003 Yokota ............... 702/150
2003/0187720 A1 10/2003 Takada

FOREIGN PATENT DOCUMENTS

| CN | 101431800 A | 5/2009 |
|---|---|---|
| JP | 2000 295167 | 10/2000 |
| JP | 2002 342557 | 11/2002 |
| JP | 2003 044969 | 2/2003 |
| JP | 2003 288687 | 10/2003 |
| JP | 2006 157502 | 6/2006 |

OTHER PUBLICATIONS

Office Action issued Mar. 15, 2013, in Korean Patent Application No. 10-2011-7023602 with English translation.

(Continued)

*Primary Examiner* — Omoniyi Obayanju
(74) *Attorney, Agent, or Firm* — Oblon, Spivak, McClelland, Maier & Neustadt, L.L.P.

(57) ABSTRACT

A communication system aimed at easily and quickly collecting data regarding macroscopic population distribution, and easily and quickly obtaining survey results. An RNC of a communication system includes a signal-counting module that counts the number of signals indicating a quantity of signals transmitted and received between a mobile station and a BTS. An information analysis device includes a population distribution calculation module that calculates population distribution based on the number of the signals that the signal-counting module counts, and an output module that outputs the population distribution that the population distribution calculation module calculates.

6 Claims, 19 Drawing Sheets

(56) References Cited

OTHER PUBLICATIONS

International Search Report issued Jun. 8, 2010 in PCT/JP10/055435 filed Mar. 26, 2010.
International Preliminary Report on Patentability and Written Opinion issued Nov. 24, 2011 in PCT/JP2010/055435 (submitting English translation only).
Korean Office Action issued Sep. 25, 2012, in Korea Patent Application No. 10-2011-7023602 (with English Translation).
Office Action and Search Report issued on Aug. 2, 2013 in the counterpart China Patent Application No. 201080015396.7 (with English Translation).
Japanese Office Action Issued Nov. 6, 2012 in Patent Application No. 2011-508327 (with English translation).

* cited by examiner

*Fig.5*

| SECTOR IDENTIFIER | LOCATION REGISTRATION AREA IDENTIFIER | NUMBER OF SIGNAL |
|---|---|---|
| 1 | 1 | 10 |
| 2 | 1 | 5 |
| 3 | 1 | 10 |
| 4 | 1 | 15 |
| 5 | 1 | 20 |
| 6 | 1 | 10 |
| 7 | 2 | 5 |
| 8 | 2 | 10 |
| 9 | 2 | 5 |
| 10 | 2 | 7 |
| 11 | 2 | 10 |
| 12 | 2 | 15 |
| ... | ... | ... |

Fig.6

| LOCATION REGISTRATION AREA IDENTIFIER | TOTAL NUMBER OF SIGNAL | NUMBER OF REGISTRATIONS | WEIGHT |
|---|---|---|---|
| 1 | 70 | 50 | 0.714286 |
| 2 | 52 | 70 | 1.346154 |
| ... | ... | ... | ... |

*Fig.7*
(a)
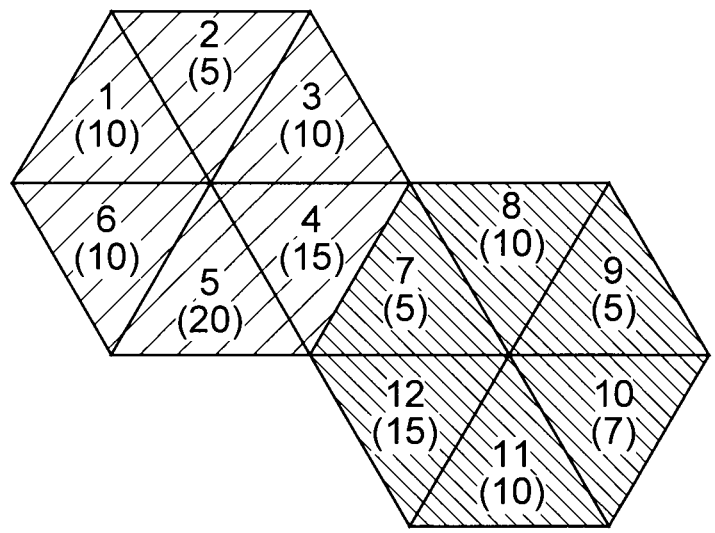
(b)
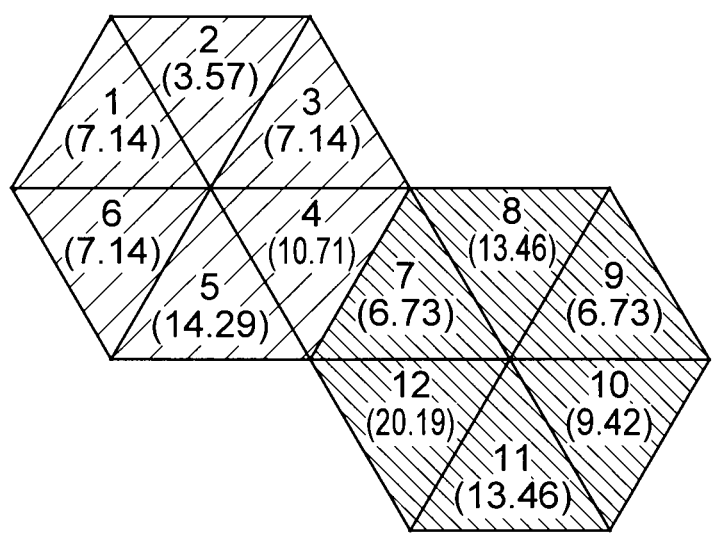

*Fig.12*

| LOCATION REGISTRATION AREA IDENTIFIER | REGISTRATION NUMBER COUNTING TIME | NUMBER OF REGISTRATIONS |
|---|---|---|
| 1 | YYYY/MM/DD 12:00:00 | 70 |
| 1 | YYYY/MM/DD 13:00:00 | 70 |
| 1 | YYYY/MM/DD 14:00:00 | 70 |
| 1 | YYYY/MM/DD 15:00:00 | 70 |
| 1 | YYYY/MM/DD 16:00:00 | 90 |
| 1 | YYYY/MM/DD 17:00:00 | 100 |
| 1 | YYYY/MM/DD 18:00:00 | 150 |
| 1 | YYYY/MM/DD 19:00:00 | 200 |
| ... | ... | ... |

Fig.15

| SECTOR IDENTIFIER | REGISTRATION NUMBER COUNTING TIME | LOCATION REGISTRATION AREA IDENTIFIER | NUMBER OF REGISTRATIONS (NUMBER OF TRANSMISSIONS AND RECEPTIONS) |
|---|---|---|---|
| 1 | YYYY/MM/DD 17:00:00 | 1 | 10 |
| 1 | YYYY/MM/DD 17:03:00 | 1 | 13 |
| 1 | YYYY/MM/DD 17:06:00 | 1 | 14 |
| 1 | YYYY/MM/DD 17:09:00 | 1 | 15 |
| 1 | YYYY/MM/DD 17:12:00 | 1 | 20 |
| 1 | YYYY/MM/DD 17:15:00 | 1 | 18 |
| 1 | YYYY/MM/DD 17:18:00 | 1 | 21 |
| 1 | YYYY/MM/DD 17:21:00 | 1 | 20 |
| 1 | YYYY/MM/DD 17:24:00 | 1 | 10 |
| 1 | YYYY/MM/DD 17:27:00 | 1 | 3 |
| 1 | YYYY/MM/DD 17:30:00 | 1 | 5 |
| 1 | YYYY/MM/DD 17:33:00 | 1 | 10 |
| 1 | YYYY/MM/DD 17:36:00 | 1 | 14 |
| 1 | YYYY/MM/DD 17:39:00 | 1 | 20 |
| 1 | YYYY/MM/DD 17:42:00 | 1 | 27 |
| 1 | YYYY/MM/DD 17:45:00 | 1 | 5 |
| 1 | YYYY/MM/DD 17:48:00 | 1 | 2 |
| 1 | YYYY/MM/DD 17:51:00 | 1 | 25 |
| 1 | YYYY/MM/DD 17:54:00 | 1 | 20 |
| 1 | YYYY/MM/DD 17:57:00 | 1 | 10 |
| ... | ... | ... | ... |

Fig.16

| SECTOR IDENTIFIER | TARGET TIME | LOCATION REGISTRATION AREA IDENTIFIER | CUMULATIVE NUMBER OF SIGNAL |
|---|---|---|---|
| 1 | YYYY/MM/DD 00:05:30 | 1 | 282 |
| 2 | YYYY/MM/DD 00:05:30 | 1 | 320 |
| 3 | YYYY/MM/DD 00:05:30 | 1 | 250 |
| 4 | YYYY/MM/DD 00:05:30 | 1 | 234 |
| 5 | YYYY/MM/DD 00:05:30 | 1 | 210 |
| 6 | YYYY/MM/DD 00:05:30 | 1 | 214 |
| 7 | YYYY/MM/DD 00:05:30 | 2 | 160 |
| 8 | YYYY/MM/DD 00:05:30 | 2 | 212 |
| 9 | YYYY/MM/DD 00:05:30 | 2 | 235 |
| 10 | YYYY/MM/DD 00:05:30 | 2 | 268 |
| 11 | YYYY/MM/DD 00:05:30 | 2 | 291 |
| 12 | YYYY/MM/DD 00:05:30 | 2 | 310 |
| ... | ... | ... | ... |

COMMUNICATION SYSTEM, INFORMATION ANALYSIS DEVICE, AND INFORMATION ANALYSIS METHOD

TECHNICAL FIELD

The present invention relates to an information analyzing apparatus and an information analyzing method for performing an approximation of population distribution and a communication system that is configured to include the information analyzing apparatus.

BACKGROUND ART

Conventionally, as a method of collecting data regarding macroscopic population distribution, there is a census that is conducted on a 5-year cycle. This survey requires a series of very laborious activities such as distributing questionnaires to those surveyed, collecting them, and tallying them with many workers, whereby it takes time to obtain the survey results. On those surveyed who respond, this survey also imposes burdens such as filling out and sending the questionnaires.

CITATION LIST

Patent Literature

[Patent Literature 1] Japanese Patent Application Laid-Open Publication No. 2003-44969

SUMMARY OF INVENTION

Technical Problem

As described above, conventionally, even only collecting data regarding macroscopic population distribution is very troublesome, and thus it is difficult to collect the data easily and quickly and obtain the survey results.

On the other hand, as an attempt to obtain population distribution by using portable terminals, in Patent Literature 1 for example, obtaining the distribution of population by using portable terminals with a GPS function is mentioned. However, even with this technique, a processing load and time for distributing to all users to be surveyed GPS built-in devices to which identifiers allowing all the users to be uniquely identifiable are added, collecting information of a position located by a GPS from one by one, and the like is necessary to obtain population distribution. Accordingly, a technique of easily and quickly collecting data regarding population distribution and investigating them has been expected.

The present invention, considering the above-mentioned problem, is aimed at easily and quickly collecting data regarding macroscopic population distribution, and easily and quickly obtaining the survey results.

Solution to Problem

To solve the above-mentioned problem, a communication system according to one aspect of the present invention is configured to include a base transceiver station that controls a sector constituting a location registration area that is a unit area for registering a location, a mobile station that is within communication range in the sector, a radio network controller that controls the base transceiver station, and an information analysis device that is communicably connected with the radio network controller. The radio network controller includes a signal-counting module that counts the number of signals indicating a quantity of signals transmitted and received between the mobile station and the base transceiver station. The information analysis device includes a population distribution calculation module that calculates population distribution based on the number of the signals that the signal-counting module counts, and an output module that outputs the population distribution that the population distribution calculation module calculates.

With the communication system thus configured, by easily and quickly collecting the number of signals such as the number of transmissions and receptions of mobile station and outputting population distribution based on this information, it is possible to easily and quickly obtain survey results regarding macroscopic population distribution.

In addition, the signal-counting module may count the number of the signals based on at least one of audio reception and packet reception to the mobile station that is within a communication range in the sector.

By being based on the number of receptions that do not directly relate to human behavior, it is possible to eliminate bias in the number of signals due to a tendency of human behavior that can occur when based on the number of transmissions (for example, transmissions are often performed from an office) and thus obtain population distribution that more properly reflects actual population distribution.

In addition, the above-mentioned communication system may be configured to further include an exchange that includes a location registration signal processing module that counts the number of registrations that is the number of mobile stations registered in the location registration area. The population distribution calculation module may include a weight calculation module that calculates a weight that is a ratio of the total number of signals being the sum of the number of the signals of the mobile station that is within communication range in the location registration area to the number of the registrations in the location registration area that the location registration signal processing module counts, and an operation module that calculates population distribution for each sector based on the weight that the weight calculation module calculates and the number of signals for each sector.

The above-mentioned exchange grasps the actual number of the mobile stations that are within communication range in the location registration area. In addition, the signal-counting module counts the number of signals for each sector that is narrower than the location registration area. Accordingly, it is possible to calculate population distribution by sector smaller than by location registration area from this information.

In addition, the above-mentioned exchange may further include a storage module that stores therein the number of the registrations and a registration counting time that is a time when the number of the registrations is counted in association with each other. The population distribution calculation module may further include a target time registration count calculation module that, based on the number of registrations counted just before a target time that is a time intended for calculating the population distribution and the number of registrations counted just after the target time, calculates the number of a target time that is the number of mobile stations registered in the location registration area at the target time. The weight calculation module may use the number of the target time registration that the target time registration count calculation module calculates as the number of the registrations.

With the communication system thus configured, even when the location registration signal processing module counts the number of registrations at given counting intervals (for example, one-hour intervals) and the target time is set to a time other than counting times, for example, it is possible to calculate the number of the target time registration based on the numbers of registrations counted before and after the target time.

In addition, the above-mentioned population distribution calculation module may further include a cumulative signal count calculation module that sets a time frame having a time period that is the same as a counting interval for the number of the registrations with the target time set as a center time, and calculates the cumulative number of signals that is a cumulative total of the number of signals counted by the signal-counting module in the time frame thus set. The weight calculation module may use the total number of signals obtained by summing up the cumulative number of signals for every sector that belongs to the location registration area.

By summing up the number of signals counted for a given time period, it is possible to moderate fluctuations in the number of signals due to short-term and accidental factors. In addition, because the time period for summing up the number of signals is the same as a time interval for the number of registrations to be counted, it is possible to absorb statistical errors, and also because the given time period for summing up the number of signals is not longer than necessary, there is no possibility to waste resources to use for processes. Accordingly, it is possible to achieve harmony with counting accuracy in the number of signals and processing costs.

To solve the above-mentioned problem, an information analysis device according to another aspect of the present invention is communicably connected with mobile station that is within a communication range in a sector that constitute a location registration area being a unit area for registering a location and is controlled by a base transceiver station via the base transceiver station. The information analysis device includes a population distribution calculation module that calculates population distribution based on the number of signals indicating a quantity of signals transmitted and received between the mobile station and the base transceiver station, and an output module that outputs the population distribution that the population distribution calculation module calculates.

With the information analysis device thus configured, by easily and quickly collecting the number of signals such as the number of transmissions and receptions of mobile stations and outputting population distribution based on this information, it is possible to easily and quickly obtain survey results regarding macroscopic population distribution.

To solve the above-mentioned problem, an information analysis method according to another aspect of the present invention is executed in a communication system configured to include a base transceiver station that controls a sector constituting a location registration area being a unit area for registering a location, a mobile station that is within communication range in the sector, a radio network controller that controls the base transceiver station, and an information analysis device that is communicably connected with the radio network controller. The information analysis method includes a signal-counting step of, by the radio network controller, counting the number of signals indicating a quantity of signals transmitted and received between the mobile station and the base transceiver station, a population distribution calculating step of, by the information analysis device, calculating population distribution based on the number of the signals counted at the signal-counting step, and an outputting step of, by the information analysis device, outputting the population distribution calculated at the population distribution calculating step.

With this method, by easily and quickly collecting the number of signals such as the number of transmissions and receptions of mobile stations and outputting population distribution based on this information, it is possible to easily and quickly obtain survey results regarding macroscopic population distribution.

Advantageous Effects of Invention

According to the present invention, it is possible to easily and quickly (in quasi-real-time) collect data regarding macroscopic population distribution and to easily and quickly obtain survey results.

BRIEF DESCRIPTION OF DRAWINGS

FIG. 5 is a chart illustrating the number of signals by sectors used in the example for explanation.

FIG. 6 is a diagram for explaining a process in a weight calculation module depicted in FIG. 2.

FIG. 7 is a diagram for explaining a process in an operation module depicted in FIG. 2.

FIG. 12 is a diagram for explaining a function of a target time registration count calculation module depicted in FIG. 11.

FIG. 15 is a diagram for explaining the function of the cumulative signal count calculation module depicted in FIG. 11.

FIG. 16 is a diagram for explaining the function of the cumulative signal count calculation module depicted in FIG. 11.

DESCRIPTION OF EMBODIMENTS

With reference to the attached drawings, embodiments of the present invention will be described. When appropriate, like reference signs are given to like parts, and redundant explanations are omitted.

[First Embodiment]
[Structure of Communication System]

Figure 1:
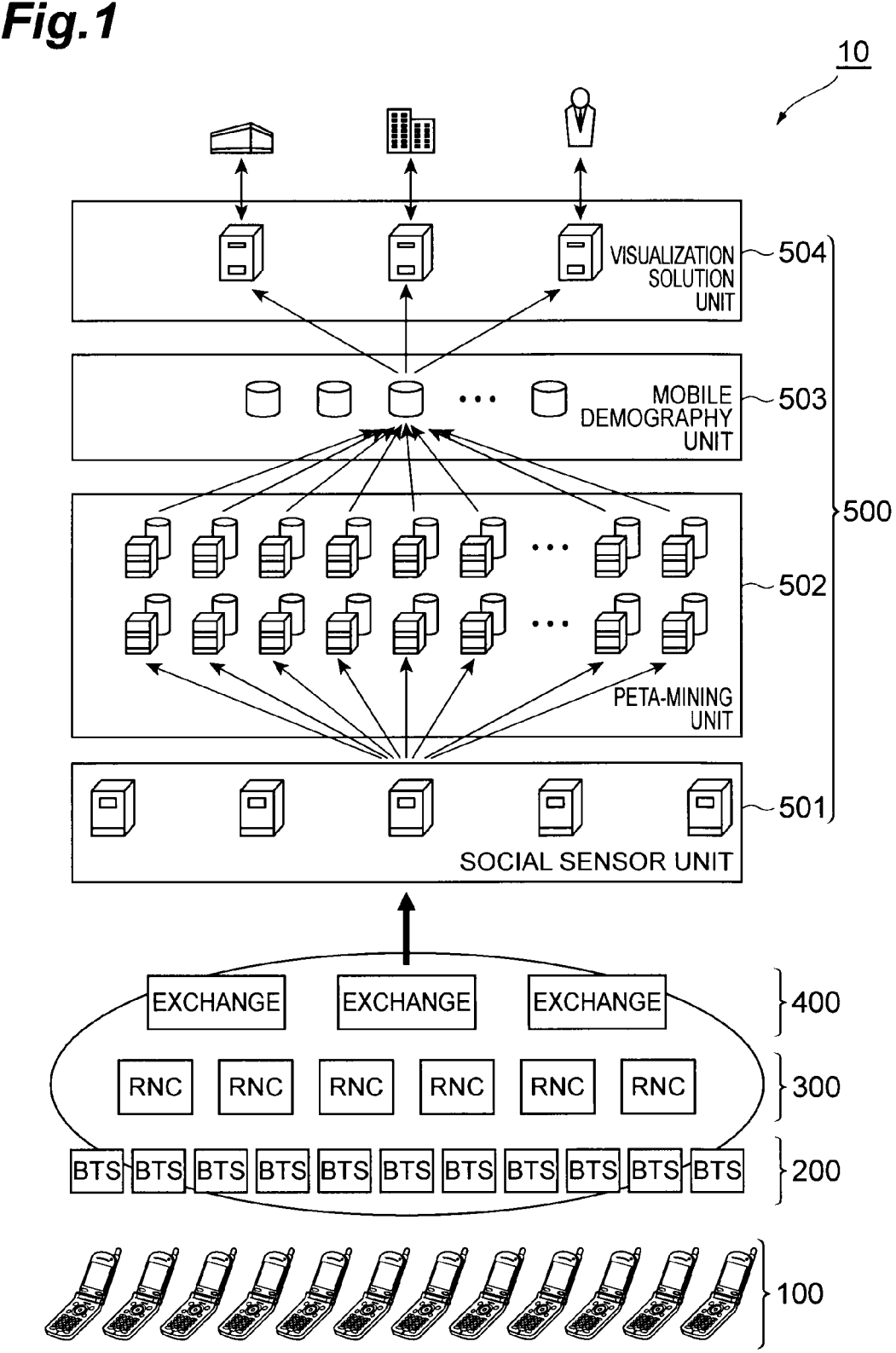
FIG. 1 is a diagram illustrating a system structure of a communication system according to first and second embodiments of the present invention.

FIG. 1 is a diagram illustrating a system structure of a communication system 10 according to a first embodiment of the present invention. As illustrated in FIG. 1, the communication system 10 is configured to include mobile stations 100, base transceiver stations (BTSs) 200, radio network controllers (RNCs) 300, exchanges 400, and a management center 500. The management center 500 is configured with social sensor units 501, peta-mining units 502, mobile demography units 503, and visualization solution units 504.

The RNCs 300 receive RRC connection request signals that the mobile stations 100 transmit via the BTSs 200. At this time, the RNCs 300 can count the number of signals to which audio reception, audio transmission, packet reception, and packet transmission are set as parameters for the RRC connection request signals. It should be noted that in the standard specification "Radio Resource Control (RRC) Protocol Specification: 3GPP TS 25.331", signal-counting in sector unit performed by the RNCs 300 is specified, and thus the present method conforms to this.

The exchanges 400 collect, via the BTSs 200 and the RNCs 300, location registration signals that mobile stations 100 transmit. While the RNCs 300 count location registration signals by sectors, the exchanges 400 manage the mobile stations 100 by location registration areas, and grasp and store therein the number of mobile stations 100 (the number of registrations) registered in location registration areas by collecting location registration signals that the mobile stations transmit. The exchanges 400 output the stored number of the mobile stations 100 registered in the location registration areas to the management center 500 at a given timing or in response to a request from the management center 500. Each of the RNC 300 herein, in general, consists of approximately one thousand pieces of them and they are positioned all over Japan. On the other hand, as for the exchanges 400, approximately 300 pieces of them are positioned all over Japan.

The management center 500, as described above, is configured to include the social sensor units 501, the peta-mining units 502, the mobile demography units 503, and the visualization solution units 504 and, in each unit, performs statistical processing using location registration signals and information regarding transmission and reception that mobile stations 100 transmit.

Each of the social sensor units 501 is server equipment that collects data stored in the exchanges 400 that is including the number of mobile stations 100 registered in location registration areas from each exchange 400. The social sensor unit 501 is configured to receive data that is output periodically from the exchanges 400, and to obtain the data from the exchanges 400 based on a timing that is predetermined in the social sensor unit 501.

Each of the peta-mining units 502 is server equipment that converts data received from the social sensor unit 501 into a given data format. For example, the peta-mining unit 502 performs a sorting process, using user IDs as keys, or by areas.

Each of the mobile demography units 503 is server equipment that performs a tallying process for data processed in the peta-mining unit 502, in other words, a counting process for each item. For example, the mobile demography unit 503 can count the number of users who are within communication range in some area, or tally distribution of users within communication range or the like.

Each of the visualization solution units 504 is server equipment that processes data tally-processed in the mobile demography unit 503 so as to make it visible. For example, the visualization solution unit 504 can perform a mapping of the tallied data onto a map. This data processed in the visualization solution units 504 is provided to companies, public offices, individuals, or the like, and is used for store development, road traffic research, disaster measures, environmental measures, and the like. However, information thus statistically processed is processed so as not to violate privacy so that individuals or the like are not identified.

All of the social sensor unit 501, the peta-mining unit 502, the mobile demography unit 503, and the visualizing solution unit 504 are configured with server equipment as described above, and their depictions are omitted, but it goes without saying that they include basic components of a conventional information processing apparatus (i.e., a CPU, a RAM, a ROM, input devices such as a keyboard and a mouse, a communication device that communicates with the outside, a storage device that stores therein information, and output devices such as a display and a printer).

Figure 2:
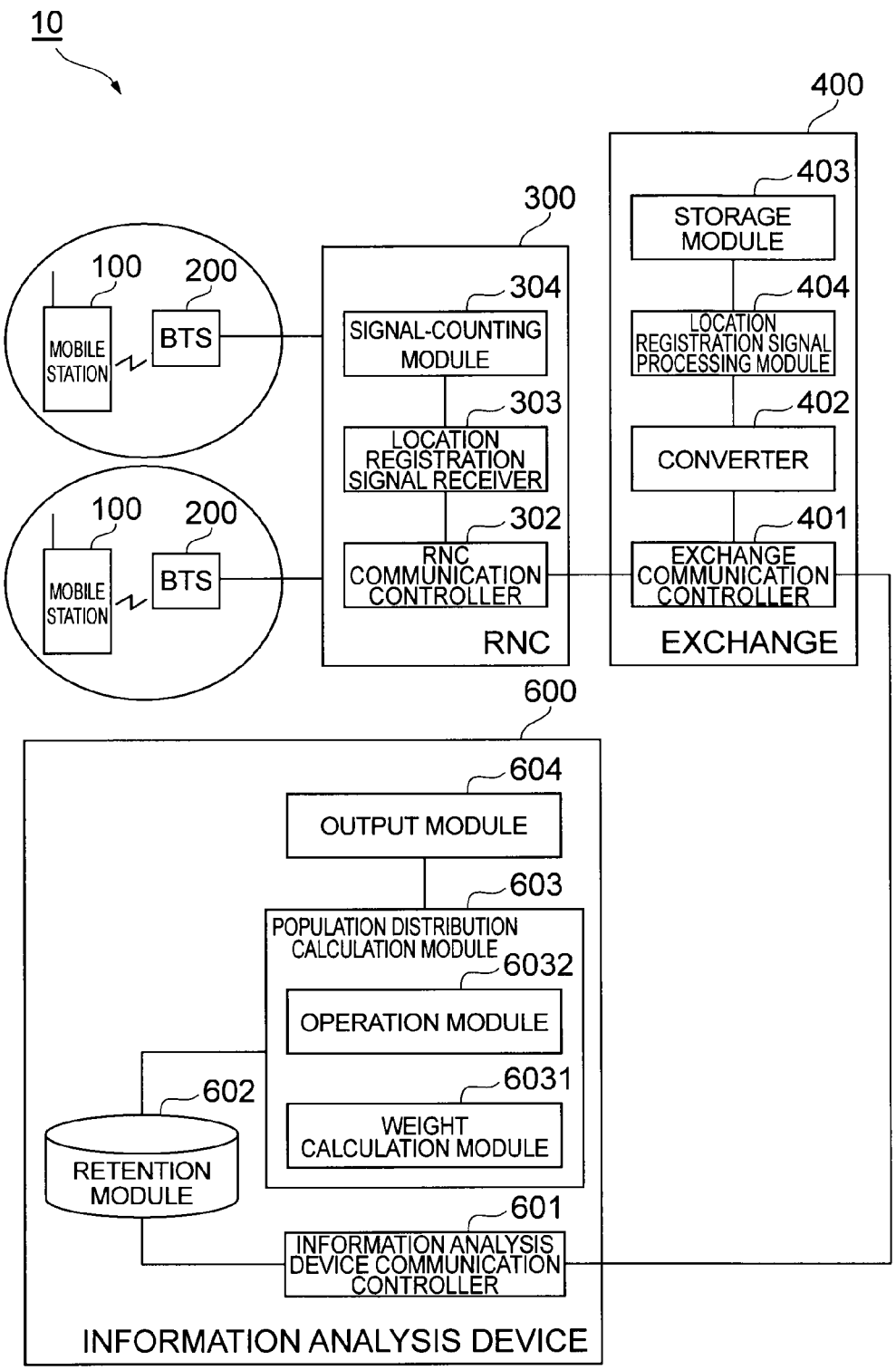
FIG. 2 is a diagram illustrating a functional structure of the communication system according to the first embodiment.

FIG. 2 illustrates a functional structure of the communication system 10. As illustrated in FIG. 2, the communication system 10 is configured to include a plurality of BTSs 200, a plurality of mobile stations 100 existing within communication range in sectors that each of a plurality of BTSs 200 controls, the RNC 300 that controls the BTSs 200, the exchange 400, and an information analyzing apparatus 600. The information analyzing apparatus 600 corresponds to the mobile demography unit 503 and the visualization solution unit 504 depicted in the above-described FIG. 1. With respect to functions corresponding to the social sensor unit 501 and the peta-mining unit 502 in FIG. 1, their depictions regarding the functions are omitted in FIG. 2.

The RNC 300 is configured to include an RNC communication controller 302, a location registration signal receiver 303, and a signal-counting module 304. The exchange 400 is configured to include an exchange communication controller 401, a converter 402, a storage module 403, and a location registration signal processing module 404.

The information analyzing apparatus 600 is configured to include an information analyzing apparatus communication controller 601, a retention module 602, a population distribution calculation module 603, and an output module 604.

The RNC 300 will be described first. The RNC communication controller 302 is a component that performs communication connection with the mobile stations 100 via the BTSs 200 and, for example, performs communication connection processing based on a transmission process from the mobile stations 100 and communication connection processing based on location registration requests. In the present embodiment, the RNC communication controller 302 can transmit an Initial UE Message used for communication connection processing to the exchange 400. It should be noted that this Initial UE Message includes the number of signals for transmission and reception. In addition, the Initial UE Message can be added instruction information (a location registration signal) indicating transmission or a location registration request, an ID that uniquely specifies the mobile station 100, and the location information. The ID herein, for example, may be ID information as a temporary ID that is delivered by the exchange 400 when the mobile station 100 connects with a network.

Figure 3:
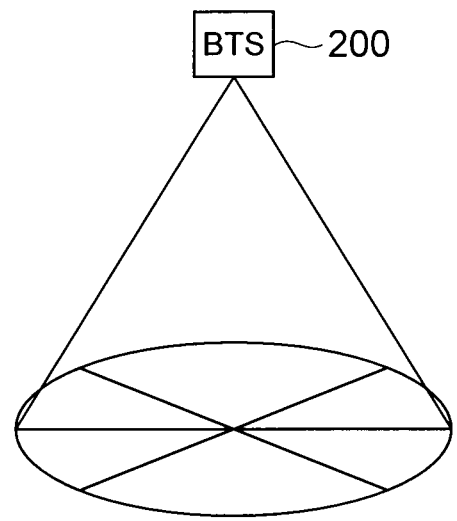
FIG. 3 is a diagram illustrating a relationship between a BTS and sectors depicted in FIG. 2.

FIG. 3 is a diagram illustrating a relationship between a BTS 200 and sectors. The BTS 200 lies in the center of an area depicted by a circle, and pieces into which the area is equally divided by the BTS 200 as a center are sectors. For example, in FIG. 3, a communication area of the BTS 200 consists of at most six sectors and, to each of the sectors, a sector identifier that can uniquely identify a sector is allocated. The RNC 300 can grasp in which sector a mobile station 100 exists by using the sector identifier via the BTS 200.

The RNC 300, further, based on delays of signals obtained when performing a process of RRC connection request, can also calculate in which location in a sector a mobile station 100 exists, and a geographical area ID (GAI) of the calculated location. It is also possible to identify the location of the mobile station 100 based on a sector ID and a location in a sector.

The location registration signal receiver 303 is a component that receives, via the RNC communication controller 302, location registration signals that a mobile station 100 transmits.

The signal count calculation module 304 is a component that counts the number of signals (the number of signals) that is information indicating a quantity of signals that a mobile station 100 being within communication range in a sector transmits and receives by sectors, and transmits the number of signals thus counted to the management center 500 via the RNC communication controller 302.

As a quantity of signals herein, it is possible to use the number of audio receptions, the number of packet receptions, the number of audio transmissions, the number of packet transmissions, and the like that are identified by a method using the above-mentioned parameters for the RRC connection request signals. However, it is not intended to be limited to this.

It is appropriate to measure the quantity of signals by a method of adding up at least one of the number of audio receptions and the number of packet receptions. When using audio transmission or packet transmission, it can be considered that the number of these transmissions relates to behavior of a human who is a user. In other words, when a user transmits, it is considered that the user does so often from a place such as an office, a house, or a station.

On the other hand, when limiting to reception, the number of receptions do not directly relate to behavior of a human who is a user of a mobile station 100 on the receiving side. Accordingly, by measuring the quantity of signals by a method of adding up the number of audio receptions and the number of packet receptions, it is possible to obtain population distribution that more properly reflects actual population distribution.

However, it goes without saying that, even if counting the number of signals based on the number of transmissions, this number is sufficiently tolerable for practical use.

The exchange 400 will be described hereinafter. The exchange communication controller 401 is a component that receives an Initial UE Message transmitted from the RNC 300 and performs communication connection processing using this Initial UE Message, and also a component that controls transmission of information such as the number of registrations and the number of signals that the storage module 403 stores therein to the information analysis device 600.

The converter 402 is a component that converts an ID such as a temporary ID included in the Initial UE Message received by the exchange communication controller 401 into a telephone number. The converter 402, in a converting process, extracts a telephone number related to an ID such as a temporary ID from a subscriber profile information storage module (not depicted) storing therein subscriber profile information, and converts it into the telephone number thus extracted. This subscriber profile information storage module is provided to a home location register (HLR) not depicted, for example, and manages and stores therein IDs such as temporary IDs and telephone numbers in association with each other.

The location registration signal processing module 404 is a component that receives location registration signals from mobile stations 100 via BTSs 200 and counts the actual number of registrations that is the number of mobile stations 100 registered in a location registration area based on the location registration signals thus received.

As described above, in the present embodiment, a mobile station 100 transmits a location registration signal when the mobile station 100 moves across location registration areas. For this reason, the location registration signal processing module 404 is capable of grasping the actual number of mobile stations 100 that exist in the location registration area. In the standard specification "Mobile Application Part (MAP) specification: 3GPP TS 29.002", a method by which an exchange 400 manages location registration is described. A process in the exchange 400 of the present embodiment conforms to this method.

The storage module 403 is a component that inputs and stores therein the number of registrations that the location registration processing module 404 counts and the number of signals received from the RNC 300 via the exchange communication controller 401. The storage module 403 can store therein telephone numbers converted by the converter 402, location information of mobile stations 100 included in an Initial UE Message, and the time when the location information is located in association with one another. The number of registrations stored in the storage module 403, in accordance with a transmission process performed by the exchange communication controller 401, is collected by the management center 500 at a given timing described later or in response to a request from the management center 500.

The exchange communication controller 401 transmits information such as the number of registration that the storage module 403 stores therein to the information analyzing apparatus 600.

The retention module 602 is a component that input the number of registrations that the location registration signal processing module 404 of the exchange 400 counts and the number of signals that the signal-counting module 304 of the RNC 300 counts via the information analysis device communication controller 601, and retain these numbers therein.

The population distribution calculation module 603 is a component that inputs the number of signals from the retention module 602 and calculates population distribution for each sector based on the number of signals thus input.

More specifically, the population distribution calculation module 603 is configured to include a weight calculation module 6031 and an operation module 6032.

The weight calculation module 6031 is a component that calculates a weight that is a ratio of the total number of signals being the sum of number of signals for mobile stations 100 that are within communication range in the same location registration area to the number of registrations in the location registration area that the location registration signal processing module 404 counts.

Figure 4:
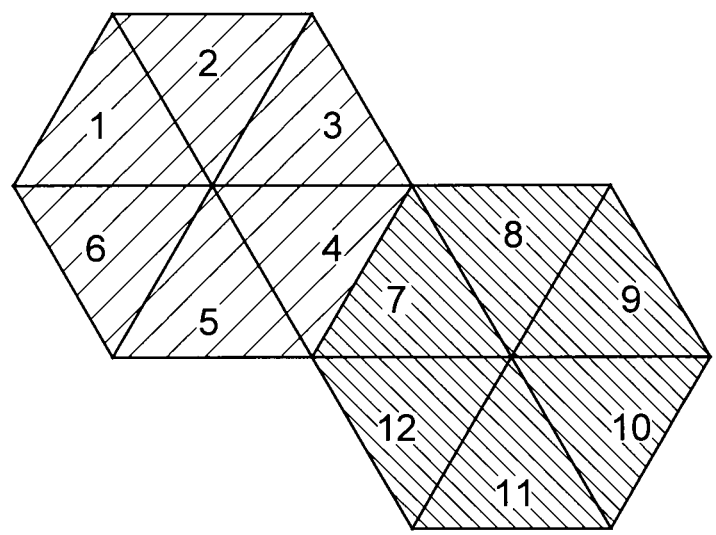
FIG. 4 is a diagram illustrating shapes of sectors and sector identifiers used in an example for explanation.

With reference to FIGS. 4 to 6, a method by which the weight calculation module 6031 calculates the weight will be described specifically.

FIG. 4 is a diagram illustrating shapes of sectors used for explaining the invention and sector identifiers that make the sectors uniquely identifiable.

In FIG. 4, one area depicted by a triangle indicates one sector. Numbers written in the centers of the triangles in FIG. 4 indicate sector identifiers. Sectors whose sector identifiers are 1 to 6 belong to the same location registration area. Sectors whose sector identifiers are 7 to 12 belong to the same (different from the location registration area to which the sectors whose sector identifiers 1 to 6 belong) location registration area.

FIG. 5 illustrates an example of the number of signals in the sectors depicted in FIG. 4. The "sector identifier" in FIG. 5 corresponds to each of the sector identifiers depicted in FIG. 4. The "location registration area identifier" in FIG. 5 is an identifier that makes a location registration area that a sector indicated by a "sector identifier" associated with each other (hereinafter, simply referred to as a "sector") forms uniquely identifiable. The "number of signals" in FIG. 5 is counted by adding up at least one of the number of audio receptions, the number of packet receptions, the number of audio transmissions, and the number of packet transmissions for mobile stations 100 being within communication range in the sectors for a unit time. It should be noted that it is appropriate for the number of signals to be counted by adding up the number of audio receptions or the number of packet receptions, as described above.

The weight calculation module 6031 inputs the number of signals associated with the sector identifiers depicted in FIG. 5 via the information analysis device communication controller 601 and the location registration area identifiers indicating the location registration areas to which the sectors belong from an association storage module not depicted, and then obtains a total number of signals that is the sum of the number of signals in sectors belonging to the same location registration areas. More specifically, the weight calculation module 6031 adds up the "the number of signals" associated with the sector identifiers whose location registration area identifiers depicted in FIG. 5 are the same.

In the example depicted in FIG. 5, adding up the number of signals in sectors whose location registration area identifier is "1" (sectors whose sector identifiers are "1" to "6") equals 70. Similarly, adding up the number of signals in sectors whose location registration area identifier is "2" (sectors whose sector identifiers are "7" to "12") equals 52.

FIG. 6 is a diagram for explaining a relationship between the total number of signals and the weight thus obtained. The "location registration area identifier" in FIG. 6 corresponds to the "location registration area identifier" in FIG. 5. The "total number of signals" in FIG. 6 is the total number of signals for each location registration area that the weight calculation module 6031 calculated by the above-mentioned method. The "number of registrations" in FIG. 6 is the number of registrations for each location registration area that the exchange 400 grasped based on location registration signals. As described above, the numbers of the registrations are the actual numbers of mobile stations 100 that actually exist in the location registration areas.

The weight calculation module 6031 calculates a "weight" by dividing the "number of registrations" by the "total number of signals". This is the "weight" in FIG. 6.

Referring back to FIG. 2, the operation module 6032 is a component that calculates population distribution for each sector based on the weight that the weight calculation module 6031 calculates and the number of signals for each sector that the retention module 602 retains therein.

More specifically, the operation module 6032 multiplies the number of signals in all the sectors by the "weight" for the corresponding location registration area.

Accordingly, with respect to sectors constituting the same location registration area, without changing the ratio between the number of signals, it is possible to obtain population distribution that more properly reflects actual population distribution.

FIG. 7 illustrates an example of calculation of population distribution performed by the operation module 6032. Numerical values written in parentheses in FIG. 7(a) indicate number of signals by sectors, and numerical values written in parentheses in FIG. 7(b) indicate population distribution. Numbers indicated in the centers of triangles in FIG. 7 indicate sector identifiers. The operation module 6032, with respect to the sectors constituting the location registration area whose location registration area identifier is 1 (the sectors whose sector identifiers are 1 to 6), calculates population distribution by multiplying the number of signals for each sector by the weight "0.714286". In addition, the operation module 6032, with respect to the sectors constituting the location registration area whose location registration area identifier is 2 (the sectors whose sector identifiers are 7 to 12), calculates population distribution by multiplying the number of signals for each sector by the weight "1.346154".

The output module 604 is a component that outputs the population distribution that the population distribution calculation module 603 calculates.

It goes without saying that the term "output" herein widely includes display output and print output. In other words, population fluidity information may be display output on a display or the like, may be print output from a printer or the like, or may be output both in display and in print.

Alternatively, when using the "output" for other systems, for example, it is acceptable to output files as numerical information.

As for the output method, specifically, it is acceptable to express population distribution with colors by painting respective sectors with colors corresponding to the population distribution. It is also acceptable to write down numerals.

[Flow of Process Performed in Communication System 10]

Figure 8:
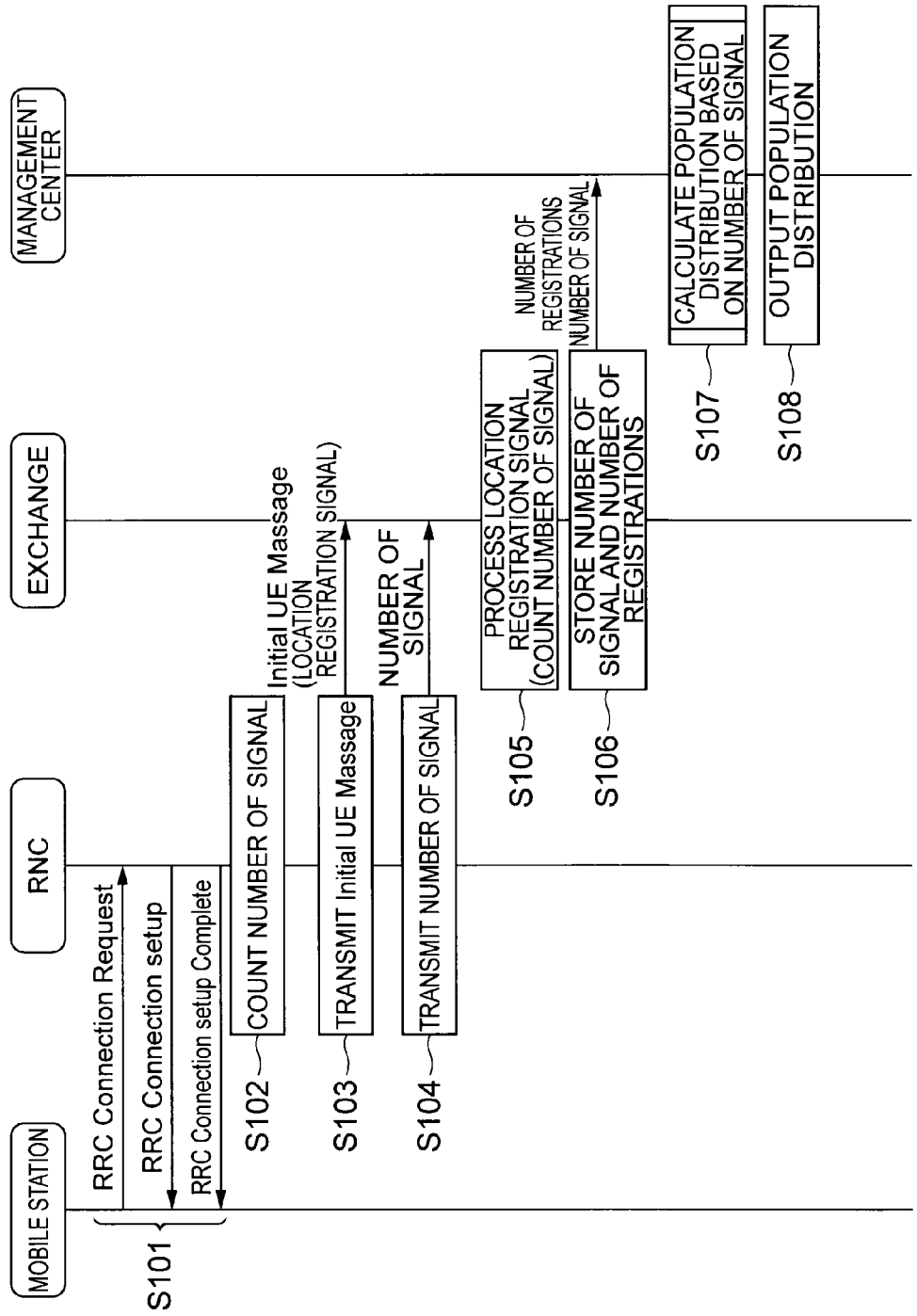
FIG. 8 is a diagram for explaining a flow of process in the communication system depicted in FIG. 2.

A flow of processes of the communication system 10 thus structured will be described hereinafter referring to FIGS. 8 and 9.

When a transmission request or a location registration request is output from a mobile station 100 and is received by the RNC communication controller 302 of the RNC 300, by the RNC communication controller 302, an RRC Connection setup is transmitted to the mobile station 100 in response to the requests. Subsequently, an RRC Connection setup Complete signal is transmitted from the mobile station 100 to the RNC communication controller 302 (step S101).

The signal-counting module 304 of the RNC 300 counts the number of signals by adding up, out of RRC Connection Request signals, those to which audio reception, packet reception, audio transmission, or packet transmission is set as parameters (step S102: signal-counting step).

The location registration signal receiver 303, via the RNC communication controller 302, adds a location registration signal to an Initial UE Message and send them to the exchange 400 (step S103). The RNC communication controller 302 transmits the number of signals counted to the exchange 400 (step S104).

The location registration signal processing module 404 of the exchange 400, based on the location registration signal that the mobile station 100 transmitted, counts the number of registrations that is the number of mobile stations 100 registered in the location registration area (step S105).

The storage module 403 of the exchange 400 stores therein the number of registrations and the number of signals that the location registration signal processing module 404 counts. The number of registrations and the number of signals thus stored are transmitted to the management center 500 via the exchange communication controller 401 at constant intervals or in response to a request from the management center 500 (step S106).

The population distribution calculation module 603 of the information analysis device 600 calculates population distribution based on the number of signals that the RNC 300 counts (step S107: population distribution calculating step).

The output module 604 outputs the population distribution that the population distribution calculation module 603 calculates (step S108: outputting step).

Figure 9:
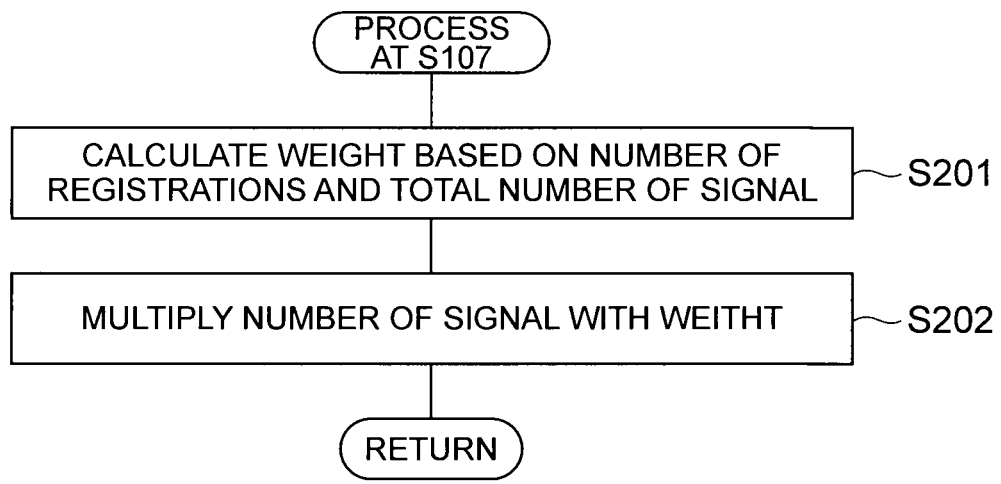
FIG. 9 is a diagram for explaining a flow of process for calculating a population distribution based on the number of signals depicted in FIG. 8.

Referring now to FIG. 9, a calculation method of population distribution based on the number of signals will be described. Processes indicated in FIG. 9 correspond to step S107 in FIG. 8.

The weight calculation module 6031 calculates a weight that is a ratio of the total number of signals being the sum of number of signals of mobile stations 100 that are within communication range in the same location registration area to the number of registrations in the location registration area that the location registration signal processing module 404 counts (step S201).

The operation module 6032 calculates population distribution by multiplying the number of signals for all sectors by the weight of the corresponding location registration areas (step S202).

[Function and Effect]

A function and an effect of the communication system 10 of the present embodiment will be described hereinafter.

The population distribution calculation module 603 of the communication system 10 of the present embodiment, based on the number of signals of mobile stations 100 that are within communication range in each sector and the number of registrations of mobile stations 100 that is within communication range in each location registration area, calculates population distribution. Accordingly, by quickly collecting information and outputting population distribution based on the information, it is possible to easily and quickly obtain data survey results regarding macroscopic population distribution.

In addition, the signal-counting module 304, based on at least one of audio reception and packet reception to the mobile stations 100 that are within communication range in each sector, counts the number of signals. By being based on the number of receptions that do not directly relate to human behavior, it is possible to eliminate bias in number of signals due to a tendency of human behavior that can occur when based on the number of transmissions (for example, transmissions are often performed from an office) and thus obtain population distribution that more properly reflects actual population distribution.

In addition, the communication system 10 of the present embodiment is configured to further include the exchange 400 that includes the location registration signal processing module 404 that counts the number of registrations being the number of mobile stations 100 registered in a local registration area. The population distribution calculation module 603 includes the weight calculation module 6031 that calculates a weight that is a ratio of the total number of signals being the sum of the number of signals for the mobile stations 100 that are within communication range in the location registration area to the number of registrations in the location registration area that the location registration signal processing module 404 counts, and the operation module 6032 that calculates population distribution for each sector based on the weight that the weight calculation module 6031 calculates and the number of signals for each sector. The exchange 400 of the present embodiment grasps the actual number of the mobile stations 100 that are within communication range in the location registration area. In addition, the signal-counting module 304 counts the number of signals for each sector that is smaller than the location registration area. Accordingly, it is possible to calculate population distribution by sectors smaller than by location registration areas from the information.

[Second Embodiment]

With reference to FIGS. 10 to 17, a second embodiment of the present embodiment will be described hereinafter. However, parts that are the same as those of the above-mentioned first embodiment will not be described here, and parts that are different from those of the first embodiment will be mainly described herein.

Figure 10:
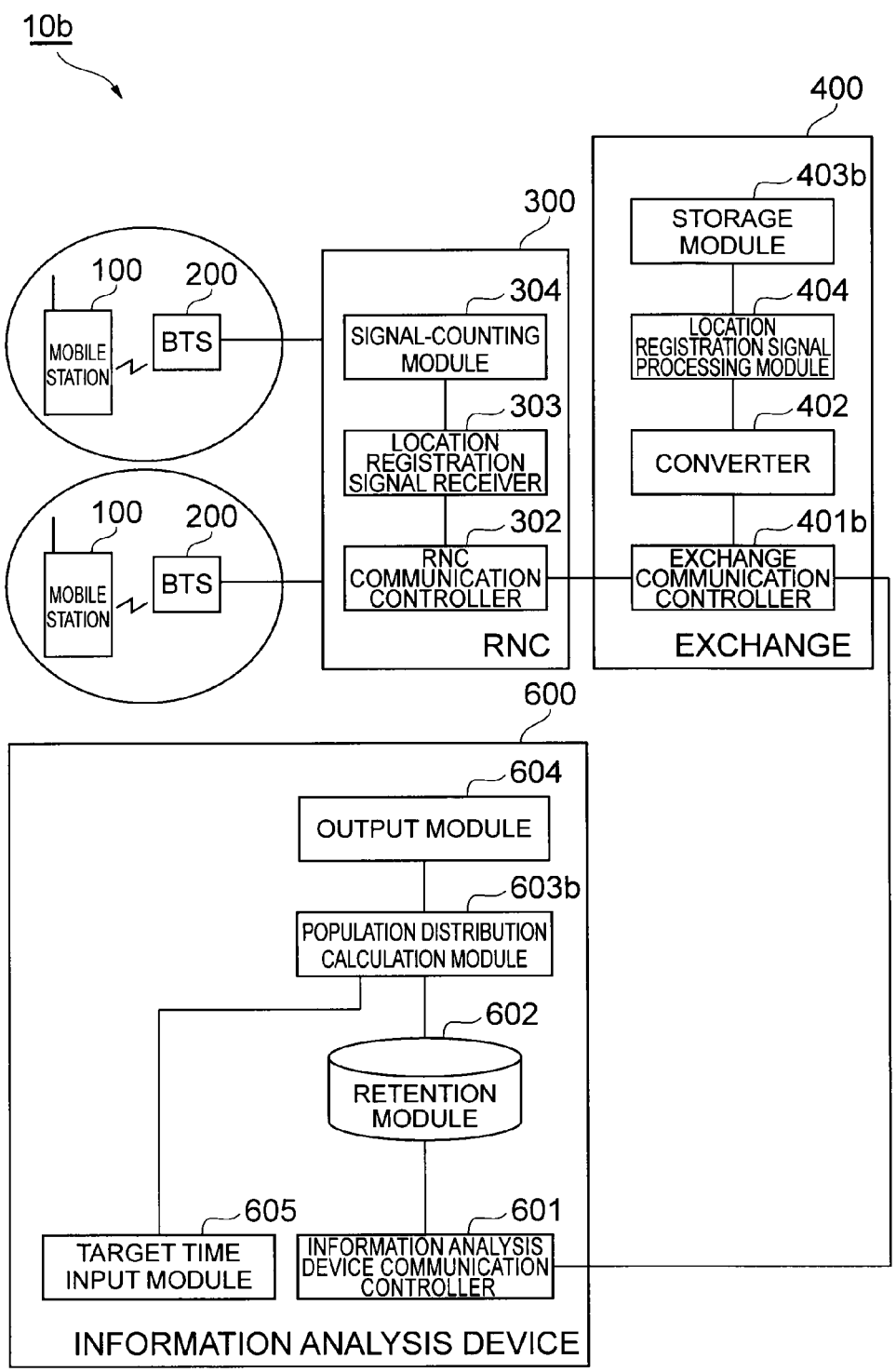
FIG. 10 is a diagram illustrating a functional structure of the communication system according to the second embodiment of the present invention.

FIG. 10 is a diagram illustrating a functional structure of a communication system 10b according to the present embodiment. As illustrated in FIG. 10, the communication system 10b of the present embodiment is configured to include mobile stations 100, BTSs 200, an exchange 400, and an information analysis device 600.

Out of these, functions that the mobile stations 100, the BTSs 200, and the RNC 300 have are the same as those of the above-mentioned first embodiment, and thus their explanation are omitted here.

The exchange 400 of the present embodiment is configured to include an exchange communication controller 401b, a converter 402, a storage module 403b, and a location registration signal processing module 404. Out of these, functions that the converter 402 and the location registration signal processing module 404 have are the same as those of the above-mentioned first embodiment, and thus their explanations are omitted here.

The storage module 403b in the exchange 400 is a component that inputs and stores therein, in addition to the number of registrations that the location registration signal processing module 404 counts and the number of signals that is received from the RNC 300 via the exchange communication controller 401b, a registration counting time that is a time when the location registration signal processing module 404 counted the number of registrations. The storage module 403b stores therein the registration counting time in association with the corresponding number of registrations.

The exchange communication controller 401b is a component that transmits to the information analysis device 600 the registration counting time in addition to the number of registrations and the number of signals that the storage module 403b stores therein.

The information analysis device 600 of the present embodiment will be described hereinafter. The information analysis device 600 is configured to include an information analysis device communication controller 601, a retention module 602, a population distribution calculation module 603b, an output module 604, and a target time input module 605.

Out of these, functions that the information analysis device communication controller 601, the retention module 602, and output module 604 have are the same as those of the above-mentioned first embodiment, and thus their explanations are omitted here.

The population distribution calculation module 603b is a component that inputs the number of signals that the signal-counting module 304 of the RNC 300 counts from the retention module 602, and calculates population distribution for each sector based on the number of signals thus input. Functions that the population distribution calculation module 603b has will be described in detail later.

The target time input module 605 is a component that accepts input of a target time that is a time intended at which the population distribution calculation module 603b calculates population distribution. The target time input module 605 is physically structured with input devices such as a keyboard and a touch panel not depicted. The target time may be manually input by a user of the communication system 10b via these physical devices. Alternatively, it is acceptable to receive it from another system not depicted.

Figure 11:
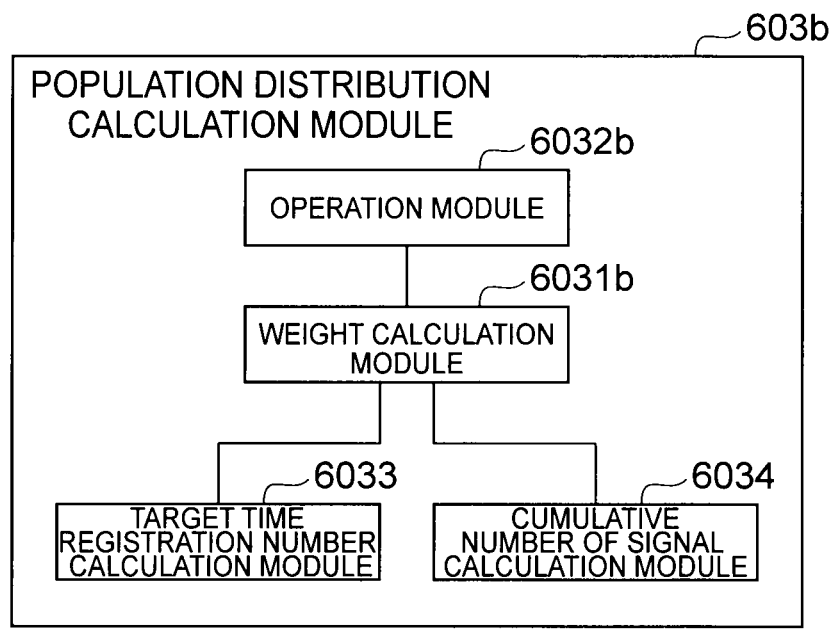
FIG. 11 is a diagram illustrating a functional structure of a population distribution calculation module depicted in FIG. 10.

With reference to FIGS. 11 to 16, functions that the population distribution calculation module 603b has will be described in detail hereinafter. As illustrated in FIG. 11, the population distribution calculation module 603b, specifically, is configured to include a weight calculation module 6031b, an operation module 6032b, a target time registration counts calculation module 6033, and a cumulative count calculation module 6034.

The target time registration count calculation module 6033, based on the number of preceding registration that is the number of registrations counted just before a target time being the time intended for calculating population distribution, the number of following registration that is the number of registrations counted just after the target time, and a time ratio of a time interval between a time when the number of preceding registration is counted and a time when the number of following registration is counted to a time period from the time when the preceding registration is counted to the target time, calculates the number of a target time registration that is the number of mobile stations 100 registered in a location registration area at the target time, and outputs the number of the target time thus calculated to the weight calculation module 6031b.

More specifically, the target time registration count calculation module 6033 inputs the target time from the target time input module 605. In addition, the target time registration calculation module 6033 inputs the number of registrations from the retention module 602.

In the present embodiment, the location registration signal processing module 404 of the exchange 400 counts the number of registrations at one-hour intervals. An example of the number of registrations that the location registration signal processing module 404 counted in a registration area whose location registration area identifier is "1" is now illustrated in FIG. 12.

Provided that the target time input is 17:30, in the example of FIG. 12, the target time registration count calculation module 6033, based on 100 that is the number of registration counted at 17:00 (the number of preceding registration), 150 that is the number of registrations counted at 18:00 (the number of following registration), and 2 to 1 that is a ratio of one hour being the time interval between 17:00 (the time when the number of preceding registration was counted) and 18:00 (the time when the number of following registration was counted) to 30 minutes that is the time period from 17:00 (the time when the number of preceding registration was counted) to 17:30 (the target time), calculates the number of the target time registration. In other words, in this example, the target time registration count calculation module 6033 adds 25 that is calculated by dividing 50 obtained by subtracting 100 being the preceding registration number from 150 being the number of following registration by 2 to 100 being the number of preceding registration. The target time registration count calculation module 6033 calculates 125 obtained in this manner as the number of the target time registration at 17:30.

Figure 13:
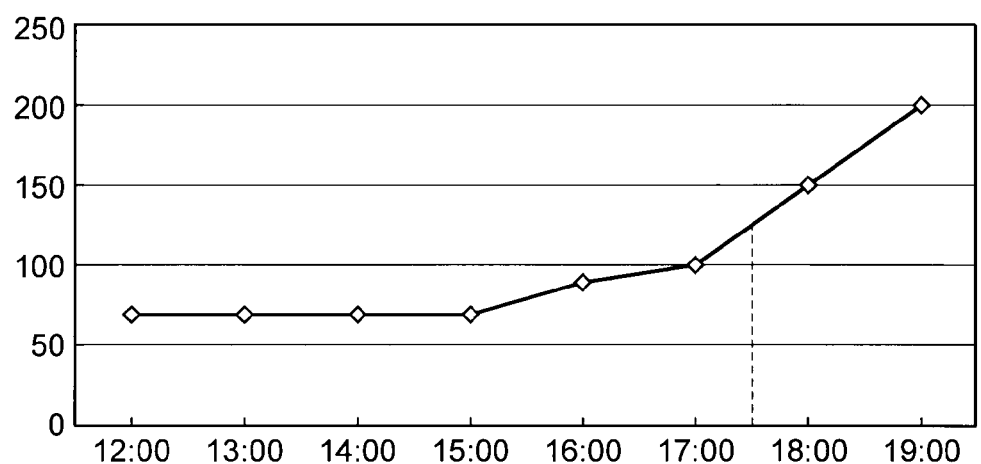
FIG. 13 is a diagram for explaining the function of the target time registration count calculation module depicted in FIG. 11.

This is conceptually a calculation method on the assumption that the number of registrations linearly changes between the time when the location registration signal processing module 404 counted the number of preceding registration and the time when it counted the number of following registration as illustrated in FIG. 13. The time indicated by a dotted line in FIG. 13 indicates 17:30 that is the target time for this time.

However, it is not necessary to limit the calculation method for the number of the target time registration to this. It goes without saying that conceivable various calculation methods are applicable.

Referring back to FIG. 11, the cumulative signal count calculation module 6034 is a component that sets a time frame having a time period that is the same as a counting interval for the number of the registrations with the target time set as a center time, and calculates the cumulative number of signals by summing up the number of signals counted by the signal-counting module 304 in the time frame thus set.

For example, if the counting interval for the number of registrations is one hour as exemplified in FIG. 12, the length of the time frame is one hour. When the target time is 17:30, the time frame is 17:00 to 18:00 for one hour with 17:30 set as the center time. Consequently, the cumulative signal count calculation module 6034 sums up the number of signals that the signal-counting module 304 counted in the time period set of 17:00 to 18:00.

Figure 14:
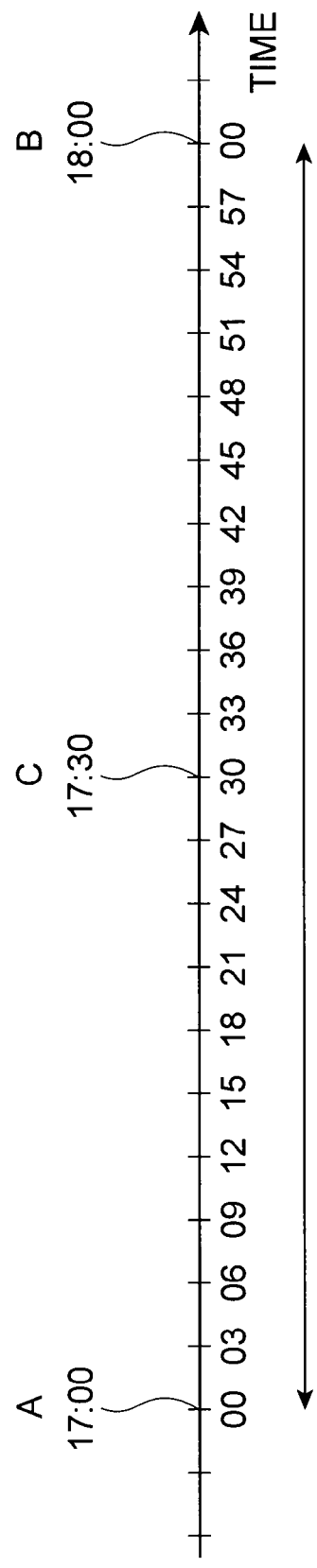
FIG. 14 is a diagram for explaining a function of a cumulative signal count calculation module depicted in FIG. 11.

For example, as conceptually illustrated in FIG. 14, when the target time is time C (17:30) in FIG. 14, the cumulative signal count calculation module 6034 sums up the number of signals counted between time A (17:00) and time B (18:00).

FIG. 15 illustrates a concrete example. FIG. 15, in sectors whose sector identifier is "1", for one hour from 17:00:00 to 18:00:00, illustrates an example of the number of signals counted at 3-minute intervals. This example indicates that, for example, the number of signals counted between 17:00:00 and 17:03:00 is 10.

In the case of this example, the cumulative count calculation module 6034 calculates 282 as the cumulative number of signals by summing up all the number of signals indicated in FIG. 15.

The cumulative signal count calculation module 6034 repeats the above-mentioned summation for each sector. Accordingly, the cumulative signal count calculation module 6034 outputs data exemplified in FIG. 16 to the weight calculation module 6031b described later.

In the present embodiment, the cumulative signal count calculation module 6034 sets a time frame having a time period that is the same as a counting interval for the number of registrations with a target time set as a center time, and calculates the cumulative number of signal by summing up the number of signals counted by the signal-counting module 304 in the time frame thus set. However, it does not need to be limited to this method.

Referring back to FIG. 11, the weight calculation module 6031b is a component that calculates a weight based on the number of the target time registration and the cumulative number of signals.

More specifically, the weight calculation module 6031b inputs the number of target time registration by location registration areas from the target time registration count calculation module 6033, and inputs the cumulative number of signals by sectors from the cumulative signal count calculation module 6034.

The weight calculation module 6031b, with respect to the cumulative number of signals by sectors input from the cumulative signal count calculation module 6034, by adding up the cumulative number of signals for sectors that belong to the same location registration signal, calculates the total number of signals for each location registration area.

The weight calculation module 6031b, by dividing each of the number of target time registration input from the target time registration count calculation module 6033 by the total number of signals calculated for the corresponding location registration area, calculates a weight for each location registration area.

The operation module 6032b is a component that, by multiplying the cumulative number of signals for each sector that the cumulative signal count calculation module 6034 calculates by the weight for the location registration area that the sectors constitute out of weights by location registration areas that the weight calculation module 6031b calculates, calculates population distribution for each sector.

[Flow of Process Performed in Communication System 10b]

Figure 17:
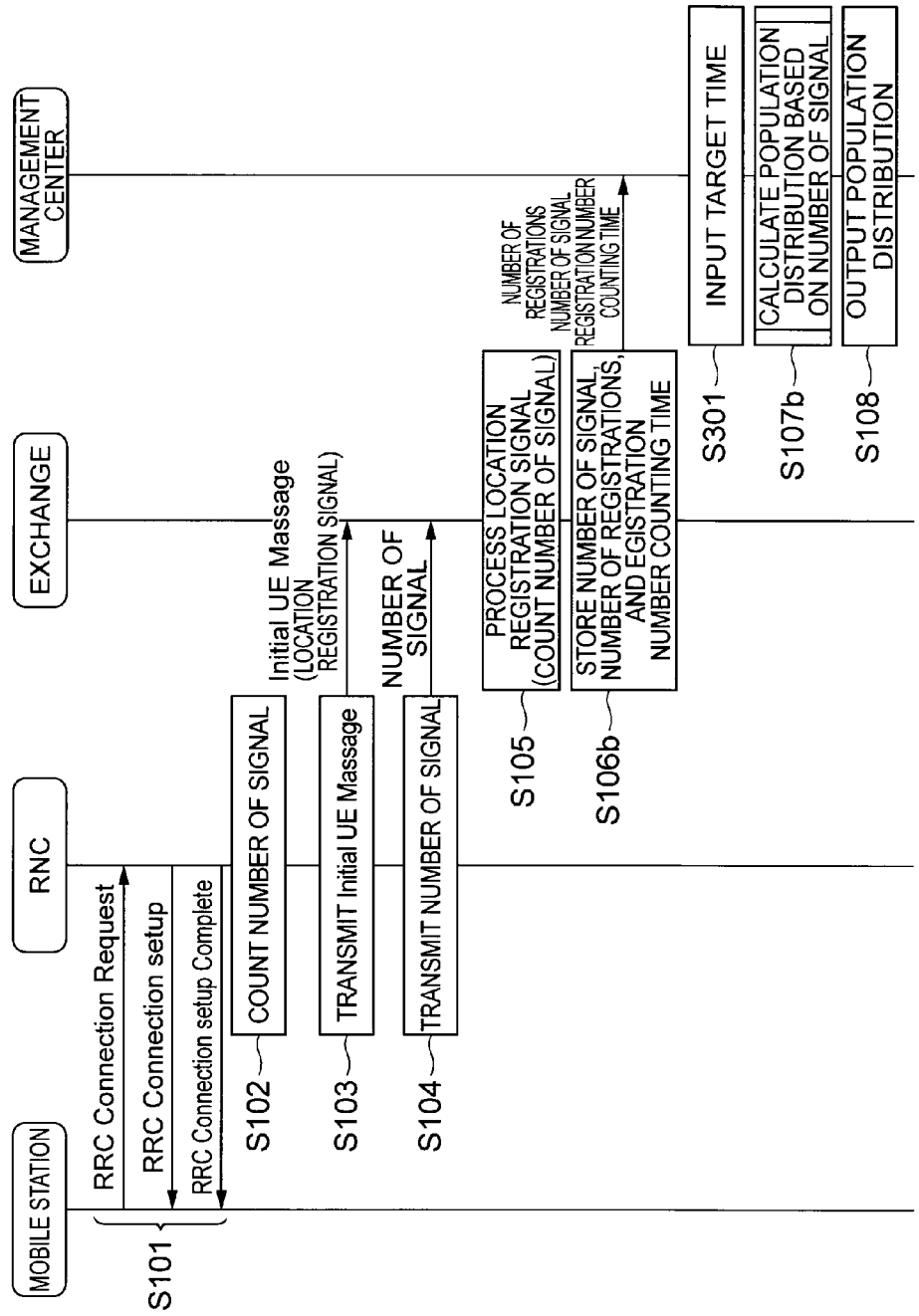
FIG. 17 is a diagram illustrating a flow of processes in the communication system depicted in FIG. 10.
Figure 18:
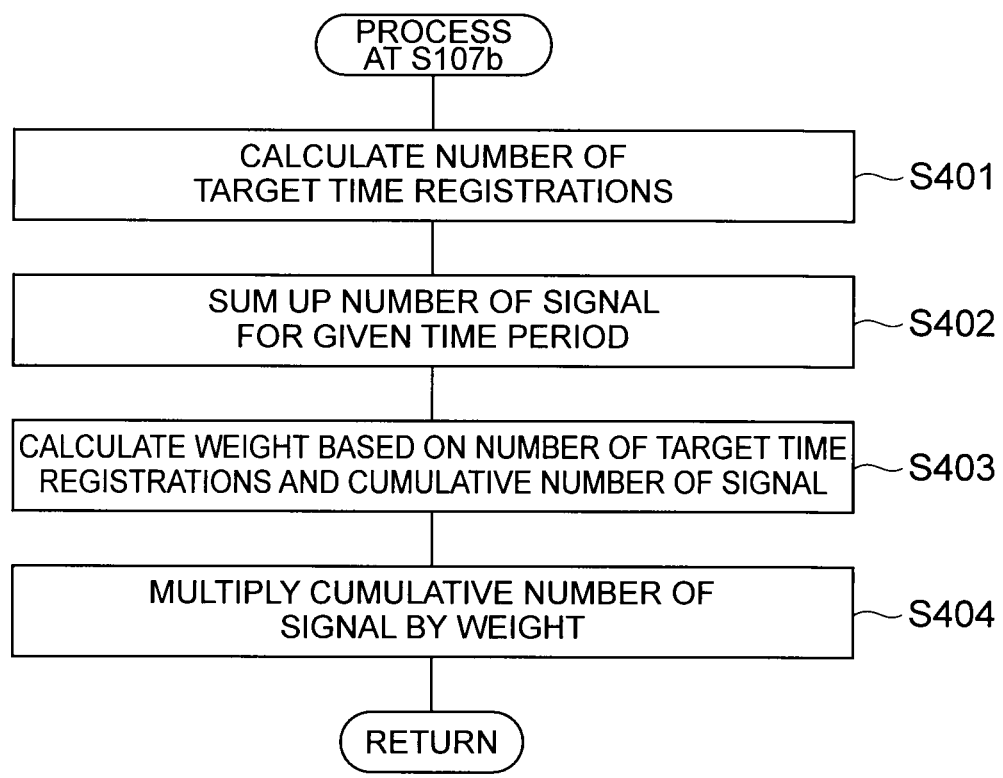
FIG. 18 is a diagram illustrating a flow of calculating processes for population distribution based on the number of signals depicted in FIG. 17.

With reference to FIGS. 17 and 18, a flow of processes in the communication system 10b will be described hereinafter.

With respect to steps S101 to S105 in FIG. 17, processes are the same as those described in the above-mentioned first embodiment, and thus their explanations are omitted here.

The storage module 403b of the exchange 400 stores therein, in addition to the number of registrations that the location registration signal processing module 404 counts and the number of signals, a registration counting time that is a time when the location registration signal processing module 404 counted the number of registrations in association with the number of the registrations. The number of registrations, the number of signals, and the registration counting time thus stored are transmitted to the management center 500 via the exchange communication controller 401b at certain intervals or in response to requests from the management center 500 (step S106b).

The target time input module 605 accepts input of a target time that is a time intended at which the population distribution calculation module 603b calculates population distribution (step S301).

The population distribution calculation module 603b inputs the number of signals that the signal-counting module 304 of the RNC 300 counted from the retention module 602, and calculates population distribution for each sector based on the number of signals thus input (step S107b). A process at step S107b will be described in detail later.

Step S108 in FIG. 17 is the same as step S108 described in the above-mentioned first embodiment, and thus the explanation is omitted here.

Referring to FIG. 18, a calculation method for population distribution based on the number of signals will be described below. Processes depicted in FIG. 18 are detailed processes in the process at step S107b in FIG. 17.

The target time registration count calculation module 6033, based on the number of registrations counted just before the target time being the time intended for calculating population distribution and the number of registrations counted just after the target time, calculates the number of a target time that is the number of mobile stations 100 registered in a location registration area at the target time (step S401).

The cumulative signal count calculation module 6034 sets a time frame having a time period that is the same as a counting interval for the number of registrations with the target time set as a center time, and calculates the cumulative number of signals by summing up the number of signals counted by the signal-counting module 304 in the time frame thus set (step S402).

The weight calculation module 6031b calculates a weight based on the number of the target time registration and the cumulative number of signals (step S403).

The operation module 6032b calculates population distribution by multiplying the cumulative number of signals for each sector with the weight for the corresponding location area (step S404).

[Function and Effect]

A function and an effect of the communication system 10b of the present embodiment will be described hereinafter.

The exchange 400 of the communication system 10b of the present embodiment further includes the storage module 403b that stores therein the number of registrations in association with a registration counting time that is a time when the number of registrations is counted. The population distribution calculation module 603b of the information analysis device 600 further includes the target time registration count calculation module 6033 that, based on the number of registrations counted just before a target time that is a time intended for calculating population distribution and the number of registration counted just after the target time, calculates the number of a target time that is the number of mobile stations 100 registered in a location registration area at the target time. The weight calculation module 6031b uses the number of the target time registration that the target time registration count calculation module 6033 calculates as the number of registrations.

Accordingly, even when the location registration signal processing module 404 counts the number of registrations at given counting intervals (for example, one-hour intervals) and the target time is set to a time other than the registration counting time, for example, it is possible to calculate the number of the target time registration based on the numbers of registrations counted before and after the target time.

The population distribution calculation module 603b of the present embodiment further includes the cumulative signal count calculation module 6034 that sets a time frame having a time period that is the same as a counting interval for the number of the registrations with the target time set as a center time, and calculates the cumulative number of signals by summing up the number of signals counted by the signal-counting module 304 in the time frame thus set. The weight calculation module 6031b uses the total number of signals obtained by adding up cumulative number of signals in all sectors belonging to the location registration area.

Accordingly, it is possible to moderate fluctuations in number of signals due to short-term and accidental factors. In addition, because the time period for the number of signals to be summed up is the same as the counting interval for the number of registrations, it is possible to absorb statistical errors, and also because the time period for the number of signals to be summed up is not longer than necessary, there is no possibility to waste resources to use for processes. Accordingly, it is possible to achieve harmony with counting accuracy in number of signals and processing costs.

[Third Embodiment]

Figure 19:
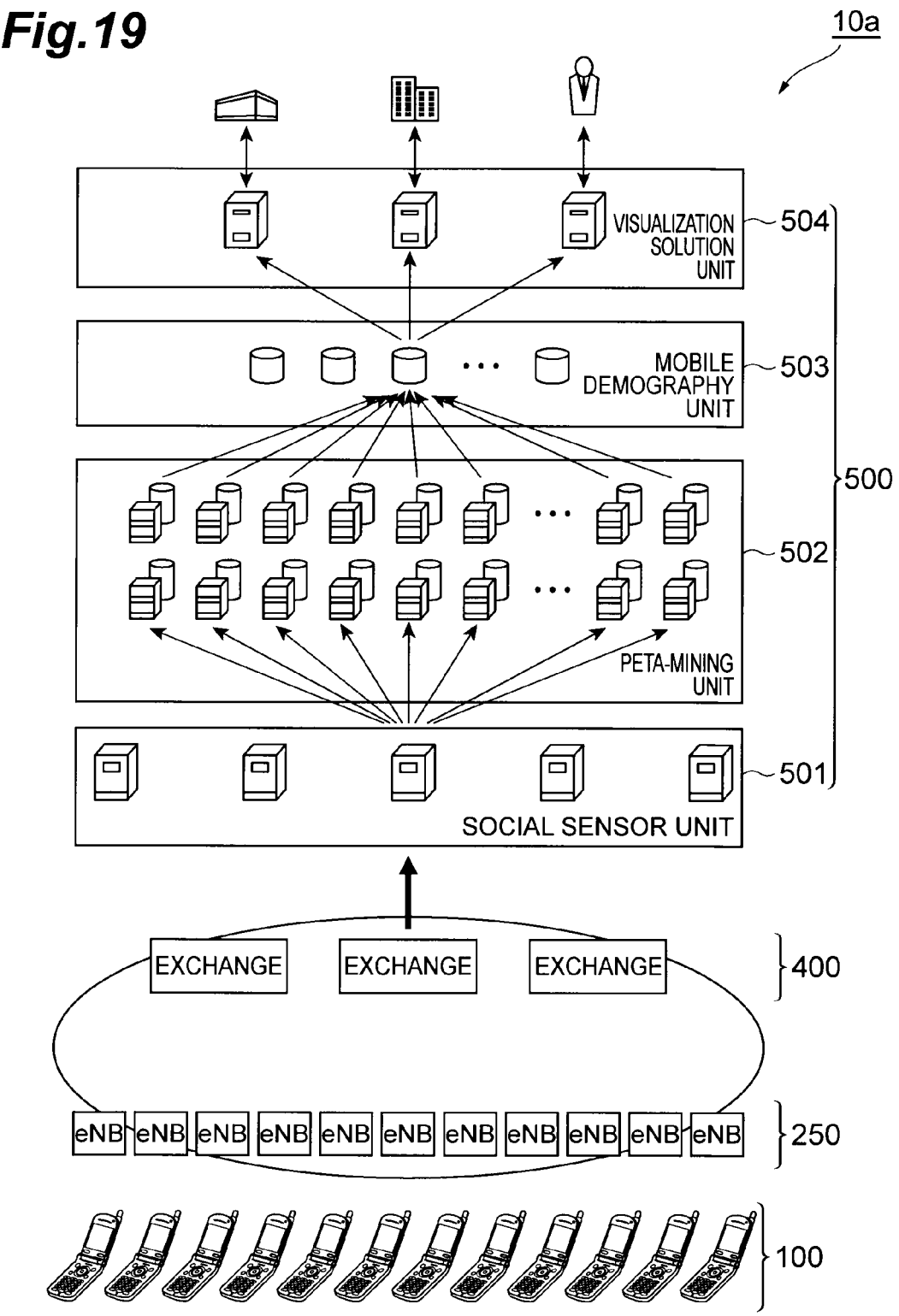
FIG. 19 is a diagram illustrating a system structure of a communication system according to a third embodiment of the present invention.

FIG. 19 is a system structure diagram of a communication system 10a according to a third embodiment of the present invention. As illustrated in FIG. 19, this communication system 10a has a system structure for the case of applying it to Long Term Evolution (LTE) that is a new communication standard, and is configured to include mobile stations 100, Evolution Node Bs (eNBs) 250, an exchanges 400, and a management center 500. The management center 500 is configured with social sensor units 501, peta-mining units 502, mobile demography units 503, and visualization solution units 504. The eNBs 250 include both functions of the BTSs 200 and the RNCs 300.

The third embodiment is a system structure for the case of applying it to LTE and the contents of its specific processes are the same as those of the above-mentioned first and second embodiments, and accordingly its specific description is omitted. In the first and the second embodiments, its protocol is Radio Access Network Application Part (RANAP). In the third embodiment, S1 Application Protocol (S1AP) used for LTE is used and, with respect to the Initial UE Message, the same signals are used for S1AP.

In the first to the third embodiments, descriptions are made assuming the third-generation cellular phone (3G) system, but these are applicable to Global System for Mobile Communications (GSM).

REFERENCE SIGNS LIST

10, 10a, 10b . . . communication system, 100 . . . mobile station, 200 . . . BTS, 250 . . . eNB, 300 . . . RNC, 302 . . . RNC communication controller, 303 . . . location registration signal receiver, 304 . . . signal-counting module, 400 . . . exchange, 401, 401b . . . exchange communication controller, 402 . . . converter, 403, 403b . . . storage module, 404 . . . location registration signal processing module, 500 . . . management center, 501 . . . social sensor unit, 502 . . . peta-mining unit, 503 . . . mobile demography unit, 504 . . . visualization solution unit, 600 . . . information analysis device, 601 . . . information analysis device communication controller, 602 . . . retention module, 603, 603b . . . population distribution calculation module, 6031, 6031b . . . weight calculation module, 6032, 6032b . . . operation module, 6033 . . . target time registration count calculation module, 6034 . . . cumulative count calculation module, 604 . . . output module, 605 . . . target time input module

The invention claimed is:

1. A communication system comprising:
   circuitry configured to
      determine a number of registrations indicating a number of mobile stations registered in a location registration area controlled by a base station;
      determine a number of signals indicating a quantity of signals transmitted and received between the mobile stations and the base station in each of a plurality of sectors corresponding to the location registration area;
      calculate a weight based on a ratio of a sum of the number of signals for each of the plurality of sectors to the number of registrations; and
      calculate a population distribution for each of the plurality of sectors based on the weight and the number of the signals for each of the plurality of sectors.

2. The communication system according to claim 1, wherein
   the circuitry is configured to determine the number of the signals for each of the plurality of sectors based on at least one of audio reception and packet reception to a mobile station that is within a communication range of each of the plurality of sectors.

3. The communication system according to claim 1, wherein the circuitry is further configured to:
   store the number of registrations in association with a time indicating when the number of registrations was determined;
   calculate a number of mobile stations registered in the location registration area at a target time based on a number of registrations determined just before a target time and a number of registrations determined just after the target time; and
   use the number of mobile stations registered in the location registration area at the target time as the number of registrations.

4. The communication system according to claim 1, wherein the circuitry is further configured to:
   set a time frame having a time period that is the same as an interval for determining the number of registrations as a center time;
   calculate a cumulative number of signals for each of the plurality of sectors in the set time frame; and
   use, as the sum of the number of signals for each of the plurality of sectors, a total number of signals obtained by summing up the cumulative number of signals for every sector that belongs to the location registration area.

5. An information analysis device comprising:
   circuitry configured to
      determine a number of registrations indicating a number of mobile stations registered in a location registration area controlled by a base station;
      determine a number of signals indicating a quantity of signals transmitted and received between the mobile stations and the base station in each of a plurality of sectors corresponding to the location registration area;
      calculate a weight based on a ratio of a sum of the number of signals for each of the plurality of sectors to the number of registrations; and
      calculate a population distribution for each of the plurality of sectors based on the weight and the number of signals for each of the plurality of sectors.

6. An information analysis method comprising:
   determining a number of registrations indicating a number of mobile stations registered in a location registration area controlled by a base station;
   determining a number of signals indicating a quantity of signals transmitted and received between the mobile stations and the base station in each of a plurality of sectors corresponding to the location registration area;
   calculating a weight based on a ratio of the sum of the number of signals for each of the plurality of sectors to the number of registrations; and
   calculate population distribution for each of the sectors based on the weight and the number of the signals for each of the plurality of sectors.

* * * * *